SYNCHRONOUS DETECTION MULTIPLEX SYSTEM

Filed April 19, 1962 2 Sheets-Sheet 1

INVENTOR:
WILLIAM H. JONES,
BY Marvin A. Goldenberg
HIS ATTORNEY.

INVENTOR:
WILLIAM H. JONES,
BY Marvin Goldenberg
HIS ATTORNEY.

1

3,108,158 SYNCHRONOUS DETECTION MULTIPLEX SYSTEM

William H. Jones, Syracuse, N.Y., assignor to General Electric Company, a corporation of New York Filed Apr. 19, 1962, Ser. No. 188,818
13 Claims. (Cl. 179—15)

The present invention relates to synchronous detection multiplex communication systems and more particularly to improved systems of the double sideband, suppressed carrier type in which a signal tone is transmitted along with a band of modulation frequencies such as audio or speech modulation.

Double sideband suppressed carrier systems are in fairly wide use in present day communication equipments. They provide a number of advantages over the emitted carrier systems, including the conservation of power normally expended by the carrier, and an ease and effectiveness in signal filtering at the receiver since filtering is performed at the modulation frequencies. They need not rely on the presence of a carrier for demodulation. In addition, they do not have the severe transmitter filter requirement characteristic of single sideband systems. In such double sideband systems a locally generated wave in the receiver, which must be locked in frequency and phase to the suppressed carrier frequency, is heterodyned with the incoming wave to provide the demodulated signal. One method for accomplishing phase lock is to provide an in-phase and quadrature-phase demodulation channel, the outputs of which are compared in a phase detector to provide an error signal for controlling the local oscillator. A receiver of this type is described in a copending application for U.S. Letters Patent Serial No. 477,169, entitled "Communication System," filed December 23, 1954, by J. P. Costas and assigned to the assignee of the present invention.

It is often desired to transmit a signal tone in addition to the primary modulation information for providing various control functions or auxiliary information. In the type of receiver equipment described above, the added signal tone necessitates the employment of additional filter components for separating the demodulated signal tone from the primary information. The present invention has the advantage of providing such multiplexing operation with less complexity in the receiver than previously possible. In particular, the filtering requirements are not as great as in the prior art. An additional advantage of the present invention is that there is permitted a more flexible operation of the signal tone without necessitating additional complexity in the system.

Accordingly, one object of the invention is to provide a novel synchronous detection multiplex system for transmitting a band of modulation frequencies plus a signal tone which has reduced filtering requirements in the receiver of said system.

Another object of the present invention is to provide a synchronous detection multiplex system for transmitting a band of modulation frequencies plus a signal tone wherein said signal tone may be applied with considerable flexibility while maintaining reduced filtering requirements in the receiver of said system.

Another object of the present invention is to provide a synchronous detection multiplex system of the type which provides a double sideband suppressed carrier wave for transmitting a band of modulation frequencies plus additional digital information in the form of signal tones wherein said signal tones may be retrieved at the receiver without the receiver required to be in a phase locked condition.

These as well as other objects of the invention are accomplished in a synchronous detection multiplex system of the type in which a band of modulation information is modulated onto a carrier frequency wave in the transmitter equipment to provide a double sideband suppressed carrier transmitted wave. The incoming wave to the receiver is heterodyned with the output from a local oscillator whose frequency and phase is locked to that of the suppressed carrier frequency to provide a demodulated wave. Phase lock of the local oscillator is accomplished by applying the incoming wave to an in-phase and quadrature-phase demodulation channel. The quadrature-phase channel derives an output voltage having a phase and amplitude indicative, respectively, of the direction of phase departure between the local oscillator output and said carrier frequency and the magnitude of said departure. The derived output voltage is compared with the output voltage derived from the in-phase channel in a phase detector to provide an error signal of positive or negative polarity which is coupled to said local oscillator. The polarity of said error signal is a function of the direction of departure of the local oscillator phase with respect to the carrier and the magnitude of the error signal is proportional to the magnitude of said departure. For a phase locked condition the output of the in-phase demodulation channel is the demodulated information in faithful reproduction, and the output of the quadrature-phase demodulation channel is nulled out.

In accordance with one aspect of the invention a multiplex signal including said modulation information plus an additional signal tone having a frequency normally outside the frequency band of the modulation information can be transmitted and received without increasing the filter requirements of the system by employing the quadrature-phase channel to additionally provide the demodulated signal tone. This is accomplished by providing a signal tone generator having a frequency different from the suppressed carrier by the amount of the tone frequency. The output energy of the tone generator is summated in a summing network with the energy of the double sideband suppressed carrier wave so that the signal tone is effectively transmitted as a single sideband modulation. The in-phase and quadrature-phase demodulation channels, in addition to the aforementioned demodulated signals, now derive the signal tone which is present in both channels independent of whether a phase lock condition exists. Accordingly, the demodulated information and the signal tone can be readily selected from the in-phase channel and quadrature-phase channel, respectively, by the employment of suitable filter means.

In accordance with a second aspect of the invention a three digit signal can be transmitted with a conservation in bandwidth of the transmitted wave effected. The signal tone oscillator selectively provides a frequency equal to the carrier frequency plus or minus the signal tone frequency, each frequency representing a first and second digit, the absence of an output from the tone oscillator representing a third digit. In addition to the error signal generating phase detector, the in-phase and quadrature-phase demodulation channels have coupled to their outputs alpha-beta networks which provide a relative phase shift of 90° between the demodulated waves. The outputs of the alpha and beta networks are compared in a second phase detector for providing output voltages of a polarity in accordance with said three digit signal.

While the specification concludes with claims particularly pointing out and distinctly claiming the subject matter which is regarded as the invention, it is believed that the invention will be better understood from the following description taken in connection with the accompanying drawings in which:

Figure 1:
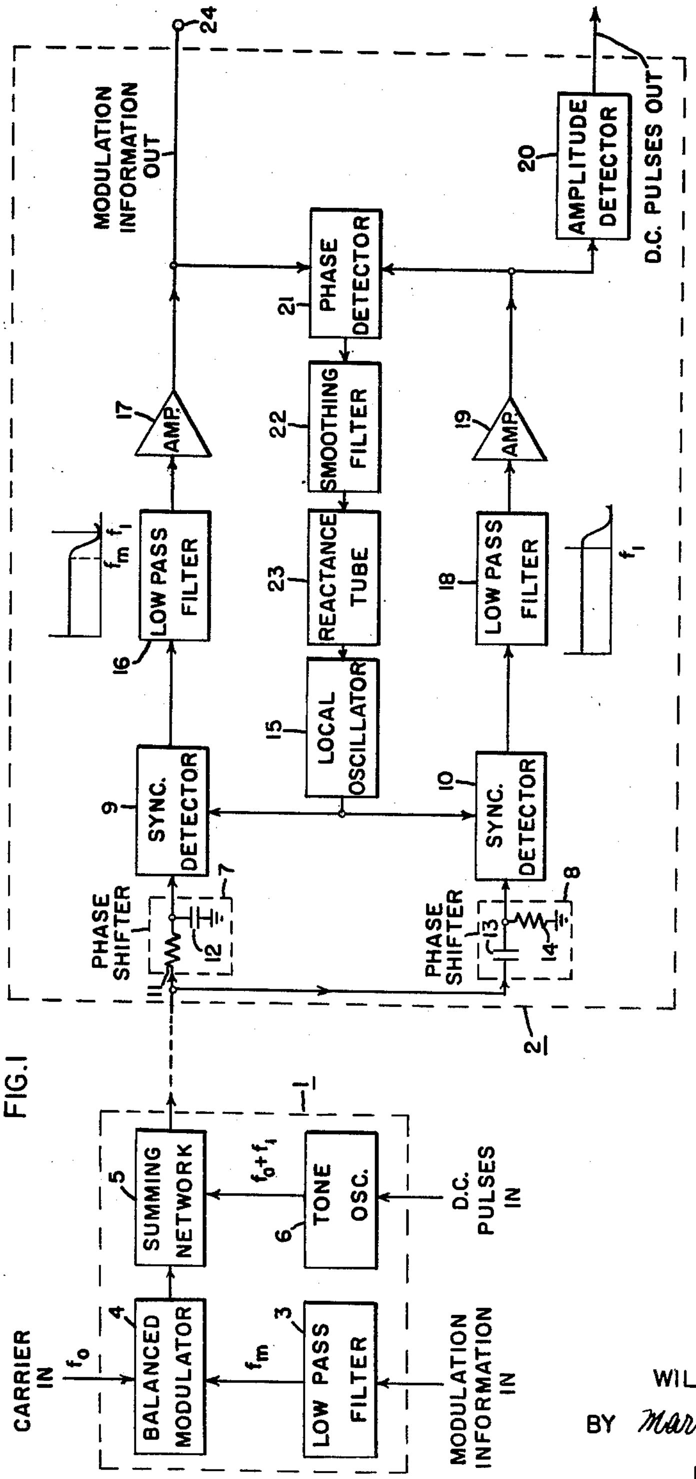
FIGURE 1 is a block diagram of a first embodiment of applicant's invention.

Referring now to FIGURE 1, there is illustrated in block diagram form applicant's double sideband suppressed carrier synchronous multiplex system in which a signal tone plus a primary modulation information are transmitted by a transmitter 1 to a receiver 2 with a minimum of filtering networks being required in receiver 2. The illustrated system has application to either wire or wireless communication. The signal tone may for example be used for dialing purposes or for other forms of relay operation, or it may provide various forms of digital information. The tone may be a single discrete frequency operated continuously or interruptedly, or may be frequency shifted.

Figure 3:
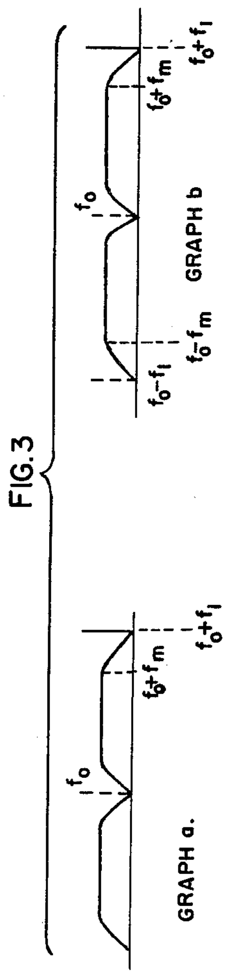
FIGURE 3 is a graph showing the relationship of the frequencies employed in FIGURES 1 and 2.

In the transmitter 1 a band of modulation information, e.g., audio modulation, is applied through a low-pass filter 3, which passes only the desired band of frequencies having bandwidth $f_m$, as a first input to a balanced modulator 4. A carrier wave of frequency $f_0$ is applied as a second input to balanced modulator 4 and is amplitude modulated by $f_m$. The double sideband suppressed carrier wave output of modulator 4 is applied as a first input to summing network 5. Digital information which may be in the form of D.-C. pulses is applied to trigger a tone oscillator 6 of frequency $f_0$ plus or minus $f_1$, where $f_1$ is normally outside the band of audio frequencies $f_m$, which is applied as a second input to summing network 5. Summing network 5 can be simply a resistance network in which the output energy from tone oscillator 6 is summated with the energy of the double sideband suppressed carrier wave from balanced modulator 4 and the resultant wave, whose frequency band is shown in graph *a* of FIGURE 3, is transmitted. Hybrid networks, well known in the communication art, may be employed for network 5 where desirable to reduce power loss.

In the receiver 2 the received wave is applied through phase shifting networks 7 and 8 as a first input to an in-phase synchronous detector 9 and a quadrature-phase synchronous detector 10, respectively. Networks 7 and 8, commonly termed alpha-beta networks, provide a relative phase shift of 90° between the first inputs to synchronous detector 9 and 10. For example, networks 7 and 8 provide −45° and +45° phase shifts, respectively, of the received wave. A simple form of network 7 may include a resistor 11 serially connected to a capacitor 12, the junction of resistor 11 and capacitor 12 connected to detector 9 and the other side of capacitor 12 connected to ground. Network 8 is the complement of network 7 including a capacitor 13 serially connected to a resistor 14, the junction of capacitor 13 and resistor 14 connected to detector 10 and the other side of resistor 14 connected to ground. A local oscillator 15 having a frequency which is required to be equal to and locked in phase with the carrier frequency $f_0$ is connected as a second input to synchronous detectors 9 and 10. Synchronous detectors 9 and 10 demodulate the received wave and may be conventional mixer circuits, preferably of sufficient linear characteristic to provide an undistorted output for relatively high level inputs of the transmitted wave, such as product detectors commonly employed in single sideband receivers. In detectors 9 and 10 the received wave is multiplied with the locally generated wave from oscillator 15 to provide at each of the outputs thereof a first voltage component related to the modulation frequency band $f_m$ plus a second voltage component related to the tone frequency $f_1$. Alternatively the detectors 9 and 10 may be of the exalted carrier type which add the locally generated wave to the received wave and peak detect the summated wave. For the latter type it is necessary that the amplitude of the locally generated wave be appreciably greater than that of the received wave, e.g., be an order of magnitude greater.

The first component voltages have a frequency equal to the modulation frequencies and a magnitude indicative of the phase error of local oscillator 15. For a phase lock condition of oscillator 15, the first voltage component at the output of detector 9 is a faithful reproduction of the modulation frequency and the first voltage component at the output of detetcor 10 is nulled out. The second voltage components are always the demodulated signal tone, independent of a phase lock condition. The output of detector 9 is applied to a low-pass filter 16 having a pass band which passes the modulation frequencies $f_m$ and rejects the tone frequency $f_1$. The output of filter 16 is amplified by amplifier 17 and the modulation information obtained therefrom is coupled at output terminal 24 to a transducer or other output means, not shown. The output of synchronous detector 10 is applied to a low pass filter 18 having a pass band which passes the modulation frequencies $f_m$ plus the tone frequency $f_1$. The output of filter 18 is amplified by amplifier 19 and provides the signal tone which is coupled to amplitude detector 20 for deriving the digit pulse information.

The output of amplifier 17 is applied as a first input to a phase detector 21. The output of amplifier 19 is provided as a second input to phase detector 21. Filters 16 and 18 and amplifiers 17 and 19 should be designed so as not to appreciably alter the phase relationship existing between the two demodulated waves at the output of synchronous detectors 9 and 10. Phase detector 21 is a form of multiplier circuit which compares the phases of the applied input voltages and generates an error signal having a polarity and magnitude determined by the magnitude and direction respectively of the phase difference between local oscillator wave and the suppressed carrier frequency wave. A detector of this type is disclosed in Terman, "Electronic and Radio Engineering," fourth edition, FIGURES 25–27. The error signal is applied through a low-pass smoothing filter 22 to a reactance tube 23 for controlling the frequency and phase of oscillator 15. Accordingly, the frequency of local oscillator 15 is maintained locked to the frequency $f_0$ of the suppressed carrier.

In considering the operation of the circuit of FIGURE 1 let it be assumed that oscillator 15 is in a free running condition, for example when transmission is initiated. The modulated double sideband wave applied to in-phase synchronous detector 9 and the quadrature-phase synchronous detector 10 is heterodyned with an improperly phased local oscillator wave. The first voltage component at the output of detector 9 has a magnitude inversely related to the magnitude of the phase error of local oscillator 15. The first voltage component at the output of detector 10 has a magnitude proportional to the magnitude of the phase error of local oscillator 15. In addition, the first voltage component of detector 10 is either in-phase or 180° out-of-phase with respect to the first voltage component of detector 9, determined by the direction of phase departure between the frequency of local oscillator 15 and the suppressed carrier frequency $f_0$. The first voltage component outputs of detectors 9 and 10, after being filtered and amplified, are compared in phase detector 21 for deriving the error signal which locks the local oscillator 15 to the carrier frequency $f_0$.

It may be noted that since any tone signal accompanying the modulation is effectively transmitted as a single sideband wave, the second voltage components provide essentially an undistorted demodulation of the tone signal, independent of a phase lock condition. Further, the second voltage components do not contribute to the error signal since one is filtered out by filter 16 and, more importantly, since the second voltage components have a phase quadrature relationship which will not produce an output from phase detector 21.

Thus, for a phase look condition, the two inputs to detector 9 will have either an in-phase or 180° out-of-phase relationship and the output voltage is maximum, providing a faithful reproduction of the modulation information plus any signal tone present. The two inputs to detector 10 will have a quadrature-phase relationship and the first voltage component at the output is nulled out. Accordingly, the in-phase channel readily provides the modulation information, the quadrature-phase channel readily provides the signal tone, and from the output of both channels is derived the error signal for maintaining phase lock. It may be seen that a filter arrangement is employed of no greater complexity than a comparable simplex transmission system absent the signal tone.

Although alpha-beta networks are shown to be employed for phase shifting the incoming wave, the in-phase and quadrature-phase relationship of the two inputs to synchronous detectors 9 and 10 may be readily obtained by alternative circuitry. For example, the incoming wave may be directly connected to the detectors 9 and 10 with the output from local oscillator 15 applied directly to the in-phase detector 9 and through a 90° phase shifter to quadrature-phase detector 10.

It is noted that since phase locking of local oscillator 15 is accomplished by the demodulated double sideband component of the received wave, a signal tone useful for control purposes can be selectively transmitted as required and need not be continuously present. In addition, since the signal tone is transmitted effectively as a single sideband wave, it is demodulated faithfully whether or not the receiver is in a phase locked condition. Thus, where required, transmission can be readily initiated by a signal tone. To avoid any spurious signal tone response it is desirable that the response time of the amplitude detector 20 be greater than the lock in time of the oscillator 15.

Where a frequency shifted signal tone is employed, additional band-pass filters may be employed at the output of amplifier 19 for individual selection of the various frequencies.

In addition, in some applications it may be desirable to employ a filter for component 16 having frequency characteristics identical to filter 18, thereby passing the tone signal. In this case it is necessary to add a simple notch filter at output terminal 24 to block the signal tone frequency, as illustrated in FIGURE 2.

Figure 2:
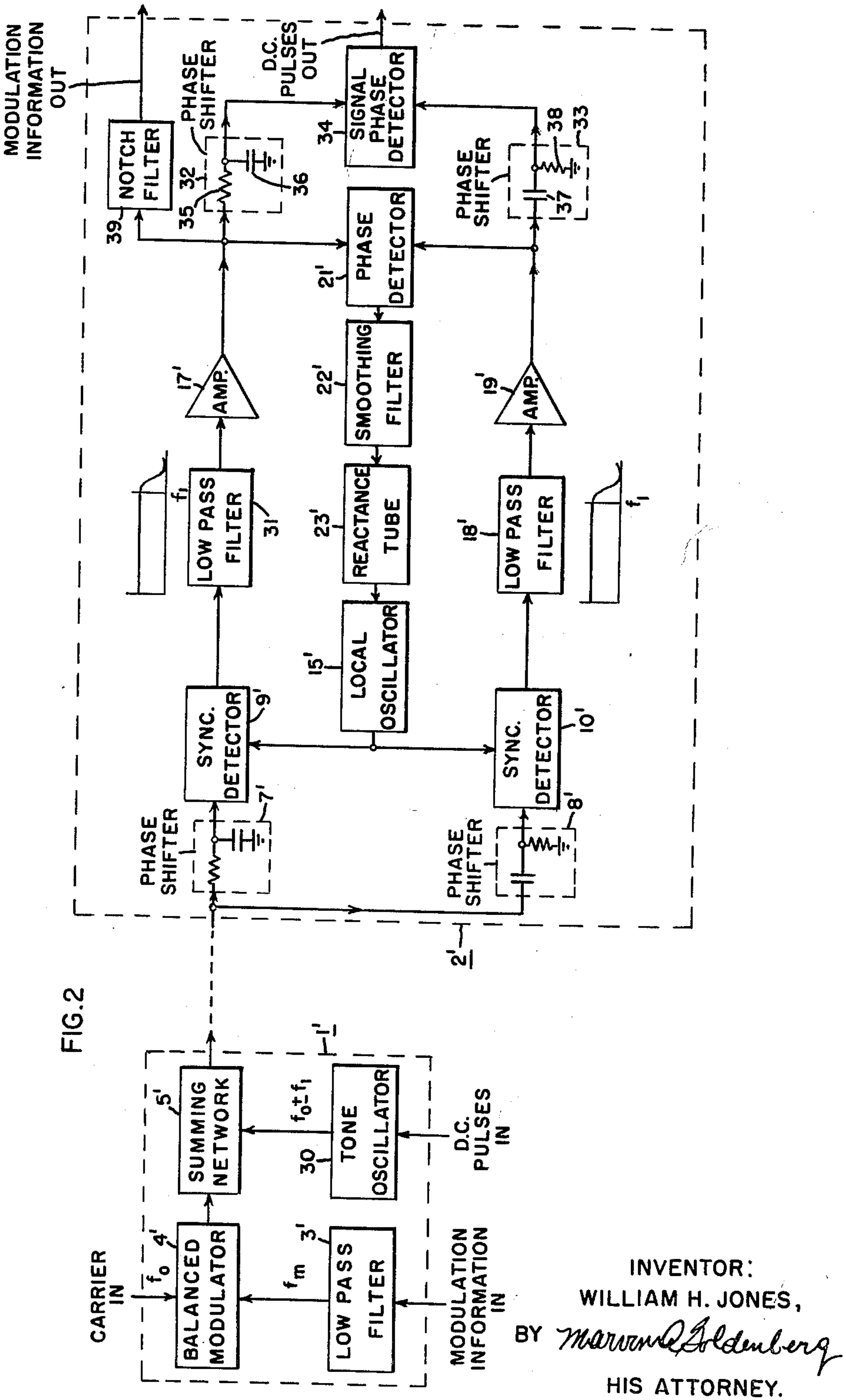
FIGURE 2 is a block diagram of a second embodiment of applicant's invention.

Referring now to FIGURE 2, there is illustrated a second embodiment of applicant's invention in which a three digit signal tone is transmitted in addition to the primary signal modulation with a conservation in bandwidth effected. It will be recognized that the circuit is an extension of the circuit of FIGURE 1, and the components which are identical in structure and function to those included in the circuit of FIGURE 1 are identified by the same reference character but with an added prime notation. Accordingly, in the transmitter equipment 1′ of FIGURE 2, low-pass filter 3′, balanced modulator 4′ and summing network 5′ are essentially identical in structure and function to corresponding components in FIGURE 1. A tone oscillator 30, which may be triggered by D.-C. pulses, provides two discrete frequencies $f_0$ plus or minus $f_1$, as shown in graph *a* of FIGURE 3, these frequencies being transmitted selectively one at a time. Tone oscillator 30 thereby provides a three digit information by frequency shifting, for example, $f_0+f_1$ representing a first digit, $f_0-f_1$ representing a second digit and the absence of a tone representing a third digit.

In the receiver equipment 2′ alpha-beta network 7′ and 8′, synchronous detectors 9′ and 10′, filter 18′, local oscillator 15′, amplifiers 17′ and 19′, audio phase detector 21′, smoothing filter 22′ and reactance tube 23′ are essentially identical in structure and function to corresponding components in FIGURE 1 and are indicated by the same reference characters but with an added prime rotation. The circuit in addition includes a low-pass filter 31 connected in the in-phase channel in lieu of the low-pass filter 16 shown in FIGURE 1, which filter has a broader pass band to pass both the tone signal and the modulation signals. At the output of amplifiers 17′ and 19′ is connected a second pair of alpha-beta networks 32 and 33, respectively, the outputs of which are coupled to a signal phase detector 34 for deriving said three digit information. Detector 34 may be of a type similar to detector 21′. Alpha-beta networks 32 and 33 serve to provide a relative phase shift of 90° to the demodulated signals appearing at the outputs of amplifiers 17′ and 19′. Alpha network 32 may simply include a resistor 35 connected to a capacitor 36 coupled to ground, the junction of resistor 35 and capacitor 36 being connected to a first input of signal phase detector 34. Beta network 33 may include a capacitor 37 connected to a resistor 38 coupled to ground, the junction of capacitor 37 and resistor 38 being connected to a second input of phase detector 34. A notch filter 39 is connected to the output of amplifier 17′ for providing the modulation information.

A three digit output voltage from signaling phase detector 34 is obtained by frequency shifting the tone oscillator 30 as will now be explained. In accordance with the adjustment of the receiver, a frequency generated by the tone oscillator of $f_0+f_1$ will provide either an in-phase or a 180° out-of-phase relationship between the two inputs applied to the signaling phase detector 34. Assuming an in-phase relationship, an output voltage of one polarity is obtained. Accordingly, a frequency of $f_0-f_1$ generated by the tone oscillator will produce inputs to the signaling phase detector 34 having a 180° phase relationship, thereby providing an output voltage of opposite polarity from detector 34. The absence of an output from tone oscillator 30 will produce a zero output from detector 34. The in-phase and quadrature-phase channels operate similarly as described with respect to FIGURE 1 to provide a phase lock of local oscillator 15′. In addition, during a temporary out-of-phase condition of local oscillator 15′, where there are derived first voltage components at the outputs of synchronous detectors 9′ and 10′, related to the out-of-phase condition, such voltage components have been said to be either in-phase or 180° out-of-phase at the outputs of detectors 9′ and 10′. Accordingly, they will be either in a 90° or 270° phase relationship at the inputs to signaling phase detector 34 and hence will not contribute to the output therefrom.

It may be appreciated that although the invention is described with respect to signal channel transmission, for purposes of illustration, the more common application would be to plural channel communication systems employing a plurality of transmitter and receiver equipments. For such plural transmission systems band conservation is effected in the circuit of FIGURE 2 since signal tone frequencies of $f_0+f_1$ and $f_0-f_1$ can be transmitted as representing two different information bits. In a circuit such as FIGURE 1 a second signal tone frequency $f_2$ is required to transmit comparable information since transmitted signal tones of $\pm f$ are not distinguishable in the receiver. This advantage is of greater significance in plural channel systems.

In addition the invention is not intended to be limited to suppressed carrier systems but extends to systems in which the carrier is partially or fully transmitted and where a local carrier frequency is generated in the receiver.

The appended claims are intended to be construed as embodying any and all modifications that fall within the true scope and spirit of the invention.

What I claim as new and desire to secure by Letters Patent of the United States is:

1. A synchronous detection multiplex system for transmitting first information as a first signal of frequency $f_m$ and second information as a second signal of frequency $f_1$ comprising:

(*a*) a transmitter for transmitting said first signal as a double sideband wave and said second signal as an effective single side band wave for reception by a receiver, (b) said receiver including generator means for deriving a locally generated wave of a frequency equal to the frequency of the carrier wave generated at the transmitter, (c) first and second demodulators for combining said locally generated wave with the received waves to each provide first and second demodulated voltage components related to said first and second signals, respectively, said first voltage components having a relative phase determined by the direction of phase departure between said locally generated wave and said carrier wave, one of said first voltage components having an amplitude proportional to the magnitude of said phase departure, said second voltage components having a substantially constant phase relationship and an amplitude invariant with respect to said phase departure, (d) phase detection means responsive to said first voltage components for deriving an error signal that is applied to said generator means for phase locking said locally generated wave to said carrier wave, said one of said first component voltages being nulled out when a phase lock condition exists, the other of said first component voltages providing a faithfully demodulated first signal, and (e) additional means responsive to the outputs from said first and second demodulators for separately providing said first and second information, respectively.

2. A synchronous detection multiplex system as in claim 1 where said additional means includes an amplitude detector coupled to the output of one of said demodulators for deriving said second information.

3. A synchronous detection multiplex system as in claim 1 wherein said additional means includes phase shifting means for shifting the phase of the first and second voltage components at the output of said first demodulator with respect to the first and second voltage components at the output of said second demodulator and second phase detection means responsive to the phase shifted second voltage components for deriving said second information.

4. A synchronous detection multiplex system for transmitting first information as a first signal of frequency $f_m$ and second information as a second signal of frequency $f_1$ comprising:

(a) a transmitter for transmitting said first signal as a double sideband wave and said second signal as an effective single sideband wave for reception by a receiver, (b) said receiver including generator means for deriving a locally generated wave of a frequency equal to the frequency of the carrier wave generated at the transmitter, (c) first and second demodulators for combining said locally generated wave with the received wave to each provide first and second demodulated voltage components related to said first and second signals, respectively, said first voltage components having a relative phase determined by the direction of phase departure between said locally generated wave and said carrier wave, one of said first voltage components having an amplitude proportional to the magnitude of said phase departure, said second voltage components having a substantially constant phase relationship and an amplitude invariant with respect to said phase departure.

(d) first and second filters coupled to said first and second demodulators, respectively, for passing at least said first signal frequency $f_m$, (e) phase detection means coupled to the outputs of said first and second filters for deriving an error signal that is applied to said generator means for phase locking said locally generated wave to said carrier wave, said one of said first voltage components being nulled out when a phase lock condition exists, the other of said first voltage components providing a faithfully demodulated first signal, and (f) additional means coupled to the outputs of said first and second filters for separately providing said first and second information, respectively.

5. A synchronous detection multiplex system as in claim 4 wherein said first filter is tuned to pass said first signal frequency $f_m$ and to reject said second signal frequency $f_1$ and said second filter is tuned to pass both said first and second signal frequencies $f_m$ and $f_1$, and said additional means includes an amplitude detector coupled to the output of said second filter for deriving said second information.

6. A synchronous detection multiplex system as in claim 4 wherein said first and second filters are turned to each pass said first and second signal frequencies $f_m$ and $f_1$, and wherein said additional means includes phase shifting means for shifting the phase of the first and second voltage components at the output of said first filter with respect to the first and second voltage components at the output of said second filter and second phase detection means responsive to the phase shifted second voltage components for deriving said second information.

7. A synchronous detection multiplex system for transmitting first information as a first signal of frequency $f_m$ and second information as a second signal of frequency $f_1$ comprising:

(a) a transmitter, (b) said transmitter including means for modulating said first signal $f_m$ on a carrier wave of frequency $f_0$ to provide a double sideband wave, (c) means for generating a second wave of a frequency different from $f_0$ by $f_1$, (d) means for summating the energy of said double sideband wave with the energy of said second wave to provide a resultant wave that is transmitted for reception by a receiver, (e) said receiver including generator means for deriving a locally generated wave of frequency $f_0$, (f) first and second demodulators for combining said locally generated wave with said resultant wave to each provide first and second demodulated voltage components related to said first and second signals, respectively, said first voltage components having an in-phase relationship when the phase departure between said locally generated wave and said carrier wave is in one direction and having an out-of-phase relationship when said phase departure is in the other direction, one of said first voltage components having an amplitude proportional to the magnitude of said phase departure, said second voltage components having a quadrature phase relationship and an amplitude invariant with respect to said phase departure, (g) phase detection means responsive to said first voltage components for deriving an error signal that is applied to said generator means for phase locking said locally generated wave to said carrier wave, said one of said first voltage components being nulled out when a phase lock condition exists, the other of said first voltage components providing a faithfully demodulated first signal, and (h) additional means responsive to the outputs from said first and second demodulators for separately providing said first and second information, respectively.

8. A synchronous detection multiplex system for transmitting first information as a first signal of frequency $f_m$ and second information as a second signal of frequency $f_1$ comprising:

(a) transmitter, (b) said transmitter including means for modulating said first signal $f_m$ on a carrier wave of frequency $f_0$ to provide a double sideband wave, (c) means for generating a second wave of a frequency different from $f_0$ by $f_1$, (d) means for summating the energy of said double sideband wave with the energy of said second wave to provide a resultant wave that is transmitted for reception by a receiver, (e) said receiver including generator means for deriving a locally generated wave of frequency $f_0$, (f) first and second demodulators for combining said locally generated wave with said resultant wave to each provide first and second demodulated voltage components related to said first and second signals, respectively, said first voltage components having an in-phase relationship when the phase departure between said locally generated wave and said carrier wave is in one direction and having an out-of-phase relationship when said phase departure is in the other direction, one of said first voltage components having an amplitude proportional to the magnitude of said phase departure, said second voltage components having a quadrature phase relationship and an amplitude invariant with respect to said phase departure, (g) first and second filters coupled to said first and second demodulators, respectively, for passing at least said first signal frequency $f_m$, (h) phase detection means coupled to the outputs of said first and second filters for deriving an error signal that is applied to said generator means for phase locking said locally generated wave to said carrier wave, said one of first voltage components being nulled out when a phase lock condition exists, the other of said first voltage components providing a faithfully demodulated first signal, and (i) additional means coupled to the outputs of said first and second filters for separately providing said first and second information, respectively.

9. A synchronous detection multiplex system as in claim 8 wherein said first filter is tuned to pass said first frequency $f_m$ and reject said second signal frequency $f_1$, and said second filter is tuned to pass said first and second signal frequencies $f_m$ and $f_1$ and said additional means includes an amplitude detector coupled to the output of said second filter for deriving said second information.

10. A synchronous detection multiplex system as in claim 8 wherein said first and second filters are tuned to each pass said first and second signal frequencies $f_m$ and $f_1$ and wherein said additional means includes phase shifting means for shifting by 90° the phase of the first and second voltage components at the output of said first filter with respect to the first and second voltage components at the output of said second filter and second phase detection means responsive to the phase shifted second voltage components for deriving said second information.

11. A synchronous detection receiver for receiving a double sideband wave containing first information in the form of a first signal of frequency $f_m$ and an effective single sideband wave containing second information in the form of a second signal of frequency $f_1$ comprising:

(a) generator means for deriving a locally generated wave, (b) first and second demodulators for combining said locally generated wave with the received waves to each provide first and second demodulated voltage components related to said first and second signals, respectively, said first voltage components having an in-phase relationship when the phase departure of said locally generated wave from a reference phase is in one direction, said reference phase being that phase required for faithful demodulation by one of said demodulators, said first voltage components having an out-of-phase relationship when said phase departure is in the other direction, one of said first voltage components having an amplitude proportional to the magnitude of said phase departure, said second voltage components having a quadrature phase relationship and an amplitude invariant with respect to said phase departure, (c) phase detection means responsive to said first voltage components for deriving an error signal that is applied to said generator means for phase locking said locally generated wave to said reference phase, said one of said first voltage components being nulled out when a phase lock condition exists, the other of said first voltage components providing a faithfully demodulated first signal, (d) phase shifting means for shifting by 90° the phase of the first and second voltage components at the output of said first demodulator with respect to the first and second voltage components at the output of said second demodulator, and (e) second phase detection means responsive to the phase shifted second voltage components for deriving said second information.

12. A synchronous detection receiver for receiving a double sideband wave containing first information in the form of a first signal of frequency $f_m$ and an effective single sideband wave containing second information in the form of a second signal of frequency $f_1$ comprising:

(a) generator means for deriving a locally generated wave, (b) first and second demodulators for combining said locally generated wave with the received waves to each provide first and second demodulated voltage components related to said first and second signals, respectively, said first voltage components having an in-phase relationship when the phase departure of said locally generated wave from a reference phase is in one direction, said reference phase being that phase required for faithful demodulation by one of said demodulators, said first voltage components having an out-of-phase relationship when said phase departure is in the other direction, one of said first voltage components having an amplitude proportional to the magnitude of said phase departure, said second voltage components having a quadrature phase relationship and an amplitude invariant with respect to said phase departure, (c) first and second filters coupled to said first and second demodulators respectively for each passing said first and second signal frequencies $f_m$ and $f_1$, (d) phase detection means coupled to the outputs of said first and second filters for deriving an error signal that is applied to said generator means for phase locking said locally generated wave to said reference phase, said one of said first voltage components being nulled out when a phase lock condition exists, the other of said first voltage components providing a faithfuly demodulated first signal, (e) phase shifting means coupled to the outputs of said first and second filters for shifting by 90° the phase of the first and second voltage components at the output of said first filter with respect to the first and second voltage components at the output of said second filter, and (f) second phase detection means responsive to the phase shifted second voltage components for deriving said second information.

13. A synchronous detection multiplex system for transmitting first information as a first signal of frequency $f_m$ and second information selectively as a second signal of frequency $+f_1$ and $-f_1$ comprising:

(a) a transmitter, (b) said transmitter including means for modulating said first signal $f_m$ on a carrier wave of frequency $f_0$ to provide a double sideband wave, (c) means for selectively generating a second wave of frequency $f_0+f_1$ and $f_0-f_1$, (*d*) means for summating the energy of said double sideband wave with the energy of said second wave to provide a resultant wave that is transmitted for reception by receiver, (*e*) said receiver including generator means for deriving a locally generated wave of frequency $f_0$, (*f*) first and second demodulators for combining said locally generated wave with said resultant wave to each provide first and second demodulated voltage components related to said first and second signals, respectively, said first voltage components having an in-phase relationship when the phase departure between said locally generated wave and said carrier wave is in one direction and having an out-of-phase relationship when said phase departure is in the other direction, one of said first voltage components having an amplitude proportional to the magnitude of said phase departure, said second voltage components having a quadrature phase relationship and an amplitude invariant with respect to said phase departure, (*g*) phase detection means responsive to said first voltage components for deriving an error signal that is applied to said generator means for phase locking said locally generated wave to said carrier wave, said one of said first voltage components being nulled out when a phase lock condition exists, the other of said first voltage components providing a faithfully demodulated first signal, (*h*) first and second phase shifting networks coupled to the outputs of said first and second demodulators for shifting by 90° the phase of the first and second voltage components at the output of said first demodulator with respect to the first and second voltage components at the output of said second demodulator, the phase shifted second voltages thereby having an in-phase relationship for second information of one of said second signal frequencies and having an out-of-phase relationship for second information of the other of said second signal frequencies, and (*i*) phase detection means responsive to said phase shifted second voltage components for deriving the second information.

No references cited.